(12) United States Patent
Rother et al.

(10) Patent No.: US 12,484,590 B2
(45) Date of Patent: *Dec. 2, 2025

(54) LOW-CARB, POMACE-BASED DOUGH PRODUCT

(71) Applicant: Denscheilmann + Wellein GmbH, Bamberg (DE)

(72) Inventors: Matthias Rother, Wangen (DE); Lydia Pollak, Lindau (DE)

(73) Assignee: Denscheilmann + Wellein GmbH, Bamberg (DE)

( * ) Notice: Subject to any disclaimer, the term of this patent is extended or adjusted under 35 U.S.C. 154(b) by 529 days.

This patent is subject to a terminal disclaimer.

(21) Appl. No.: 17/774,216

(22) PCT Filed: Nov. 4, 2020

(86) PCT No.: PCT/EP2020/080995
§ 371 (c)(1),
(2) Date: May 4, 2022

(87) PCT Pub. No.: WO2021/089641
PCT Pub. Date: May 14, 2021

(65) Prior Publication Data
US 2024/0090513 A1    Mar. 21, 2024

(30) Foreign Application Priority Data
Nov. 4, 2019 (DE) .................... 10 2019 129 677.3

(51) Int. Cl.
| A21D 2/36 | (2006.01) |
| A21D 13/06 | (2017.01) |
| A21D 13/41 | (2017.01) |
| A21D 13/42 | (2017.01) |
| A23L 19/00 | (2016.01) |

(52) U.S. Cl.
CPC ............... *A21D 2/36* (2013.01); *A21D 13/06* (2013.01); *A21D 13/41* (2017.01); *A21D 13/42* (2017.01); *A23L 19/07* (2016.08)

(58) Field of Classification Search
CPC ........ A21D 13/06; A21D 13/41; A21D 13/42; A21D 13/43; A21D 13/44; A21D 2/36
USPC ........................................................ 426/550
See application file for complete search history.

(56) References Cited

U.S. PATENT DOCUMENTS

2022/0400691 A1* 12/2022 Rother .................... A21D 13/41

FOREIGN PATENT DOCUMENTS

| DE | 3700953 C2 | 4/1994 | |
| EP | 2112885 B1 | 11/2009 | |
| GB | 2548842 A | 10/2017 | |
| RU | 2222949 C1 | 2/2004 | |
| WO | WO-2008105657 A1 * | 9/2008 | ............. A21D 13/04 |
| WO | 2009037086 A1 | 3/2009 | |
| WO | 2017167644 A1 | 10/2017 | |

OTHER PUBLICATIONS

Mesaoudi et al., "Physicochemical and sensory properties of pancake enriched with freeze dried date pomace powder", Annals, Food Science and Technology, 19/1, pp. 59-68, Mar. 2018.
Solvita Kampuse et al: "Quality Parameters of Wheat Bread Enriched with Pumpkin (*Curcurbita moschata*) By-Products", Acta Universitatis Cibiniensis, Series E: Food Technology, Bd. 19, Nr. 2, Dec. 1, 2015, pp. 3-14, XP055653249, ISSN: 2344-1496, DOI:10.1515/aucft-2015-0010.
Database WPI, Week 200425 2004, Thomson Scientific, London, GB; AN 2004-265858, XP002802163.
Belovic Miona et al: "The influence of concentration and temperature on the viscoelastic properties of tomato pomace dispersions", Food Hydrocolloids, Elsevier BV, NL, Bd. 61, Jun. 20, 2016, pp. 617-624, XP029683516, ISSN: 0268-005X, DOI: 10.1016/J.FOODHYD.2016.06.021.
Sudha et al: "Apple pomace as a source of dietary fiber and polyphenols and its effect on the rheological characteristics and cake making", Food Chemistry, Elsevier Ltd, NL, Bd. 104, Nr. 2, May 3, 2007, pp. 686-692, XP022055347, ISSN: 0308-8146, DOI: 10.1016/J.FOODCHEM.2006.12.016.
Mildner-Szkudlarz Sylwia et al: "Physical and Bioactive Properties of Muffins Enriched with Raspberry and Cranberry and Pomace Powder: A Promising Application of Fruit By-Products Rich in Biocompounds", Plants Foods for Human Nutrition, Kluwer Academic Publishers, NL, Bd. 71, Nr. 2, Apr. 1, 2016, pp. 165-173, XP035929361, ISSN: 0921-9668, DOI: 10.1007/S11130-016-0539-4.
Tanska Malgorzata et al: "Effect of Fruit Pomace Addition on Shortbread Cookies to Improve Their Physical and Nutritional Values", Plant Foods for Human Nutrition, Kluwer Academic Publishers, NL, Bd. 71, Nr. 3, Jun. 18, 2016, pp. 307-313, XP036038216, ISSN: 0921-9668, DOI: 10.1007/S11130-016-0561-6.
Wang H J et al: "Direct Use of Apple Pomace in Bakery Products", Journal of Food Science, Wiley-Blackwell Publishing, Inc, US, Bd. 54, Nr. 3, May 1, 1989, pp. 618-620, XP000032274, ISSN: 0022-1147, DOI: 10.1111/J.1365-2621.1989.TB04665.X.
M Wadhwa et al: "Wastes to worth: value added products from fruit and vegetable wastes.", Cab Reviews: Perspectives in Agriculture, Veterinary Science, Nutrition and Natural Resources, Bd. 10, Nr. 043, Jan. 1, 2015, pp. 1-25, XP055461537, DOI: 10.1079/PAVSNNR201510043.

(Continued)

*Primary Examiner* — Brent T O'Hern
(74) *Attorney, Agent, or Firm* — Bachman & LaPointe, P.C.

(57) ABSTRACT

The invention relates to a pomace-based dough product preferrably produced including a vegetable proportion based on one or more pomaces of at least 20%, preferably at least 30% and more preferably at least 40% in the dry mass of the dough product, wherein the dough product has a carbohydrate proportion (abs.) of less than 20%, preferably less than 10% and more preferably less than 5%.

20 Claims, No Drawings

(56) References Cited

OTHER PUBLICATIONS

Anonymous: "Einfaches Gemuse Cracker Rezept (mit Trester)—lecker & gesund", 9. Apr. 2019, XP055847348, Gefunden im Internet: URL:https:// www.isshappy.de/einfaches-gemuese-cracker-rezept-lecker-gesund/.
International Search Report for corresponding application No. PCT/EP2020/080995 dated Mar. 15, 2021.
International Preliminary Report on Patentability for corresponding application No. PCT/EP2020/080995 dated Feb. 7, 2022.
European Search Report for corresponding application No. EP19206879.9 dated Jan. 7, 2020.
German Search Report for corresponding application No. DE10 2019 129 677.3 dated May 25, 2020.

\* cited by examiner

LOW-CARB, POMACE-BASED DOUGH PRODUCT

BACKGROUND OF THE INVENTION

The invention relates to a low-carb and preferably vegan, pomace-based dough product and to a method for producing the dough product according to the invention.

Dough products such as pizza bases, tortillas, pasta or bread based on wheat flour or based on other cereals, in particular cereals containing gluten, are sufficiently known and have also been marketed as industrial food products for years. They typically have a relatively high carbohydrate content. Low-carb dough products have also been available on the market. However, they are relatively rich in protein due to the use of gluten, chicken protein, milk protein, legume flours, or plant protein isolates. Gluten-free substitutes, in which the flour is typically replaced with starch, which means less dietary fiber and a higher glycemic index, are also known.

It is also known that a more health-conscious diet is increasingly important to the consumers. There already are dough products on the market which are enriched with vegetable juices, vegetable flours, or vegetable purees, for example, to address this fact. However, the known products are disadvantageous in that the addition of juices or vegetable flours primarily leads to an enrichment in sugar and/or that water is primarily added in the form of juice or puree. This changes the actual content of, for example, wheat flour only marginally or even to the detriment of sugar. Also, a number of vegetable fibers, such as vegetable fibers based on carrots, potatoes or peas, in refined, dried form are available on the market. However, these products no longer have anything in common with the original raw vegetable goods in terms of both color and taste and are thus suitable merely as a neutral additive and not as a product influencing or determining taste in a food.

WO 2009/037086 A1 discloses a fresh pasta product consisting of a dough of flour, in particular durum wheat semolina flour or rice flour, eggs, and water, wherein the dough preferably has 20 to 36 wt % of one or more fresh vegetables. The fresh vegetables admixed to the dough primarily add water to the product.

DE 37 00 953 C2 discloses a soft pastry produced from a dough consisting of bread cereals, such as wheat, rye or barley, raising agent, liquid, and salt, wherein the dough preferably has 45 wt % bread cereal component in ground, crushed and/or rolled form and preferably about 45 wt % of fruit and vegetables in fresh, preserved or conserved form. The primary aim of this is to achieve a lower calorific value of the pastry.

EP 2 112 885 B1 discloses a non-vegan food product which is produced from a mixture of components containing protein, such as finely ground meat, and juiced vegetables. The juiced vegetables should have as high a moisture content as possible in order to allow them to be kneaded into a dough comprising the protein-containing components of the product. The provided vegetable content is supposed to serve as an additive for optimizing the texture of meat products by means of the high moisture content.

Solvita Kampuse et al.: "Quality Parameters of Wheat Bread Enriched with Pumpkin (*Cucurbita* Muschata) By-Products", Acta Universitatis Cibiniensins Series E: Food Technology, Vol. 19, No. 2, discloses a wheat bread enriched with vegetable pomace.

GB 2548842 A discloses a high-carb snack product based on a starch-based dough matrix and comprising a whole grain cereal component and a fruit or vegetable pomace content. The starch matrix contained in the snack product is essential to the product, in particular also for achieving an intended expansion of the product when it is briefly heated by air popping or frying.

Database WPI, Week 200425 2004, Thomson Scientific London, GB, AN 2004-265858 & RU 2 222 949 C1 (Modern Techn Economics Inst), Feb. 10, 2004, discloses a production method for a dough product comprising an emulsifier, the emulsifier being supposed to have a tomato pomace content and a plant-based oil in a ratio of 40:60 to 60:40. This results in a tomato-oil paste which is supposed to be contained in a baked dough product in a proportion of 3 to 5 wt %.

Belovic Miona et al.: "The influence of concentration and temperature on the viscoelastic properties of tomato pomace discersions", Food Hydrocolloids, Elsevier BV, NL, Vol. 61, Jun. 20, 2016, pages 617-624, discloses properties of tomato pomaces.

SUMMARY AND DETAILED DESCRIPTION

The object of the present invention is to provide an improved dough product as a food product. Furthermore, the invention addresses other problems or provides the solution to other problems, as is apparent from the following description.

The underlying object is attained by the dough product according to the invention and the associated production method having the features of the independent claims. Advantageous embodiments of the invention are indicated in the dependent claims.

In a first aspect, the present invention relates to a pomace-based dough product as a ready-to-eat food product having a vegetable content based on one or more pomaces and of at least 20%, preferably at least 30%, further preferably at least 40%, and even more preferably at least 50% in the dry matter of the dough product, the dough product having 30 to 65% dry matter, and the dough product having a carbohydrate content (abs.) of less than 20%, preferably less than 10%, further preferably less than 7%, and even more preferably less than 5%. The dough product is preferably produced by the method according to the invention.

The invention is first based on the realization that a known pomace remaining after squeezing vegetables to obtain juice, extracts and/or concentrate is suitable for being processed into food for human consumption, in particular if it is treated accordingly, and thus not limited to the use in the feed industry. Furthermore, it has been found that the dry matter in a preferably industrially produced or provided vegetable pomace is enriched in such a manner that the vegetable pomace can be used in a dough product and preferably without further refining and that relatively high vegetable contents in the dry matter can thereby be realized. In particular, it has been found that a pomace-based vegetable content is suitable as an essential component aside from water, preferably the most essential component, in particular as a substantial flour substitute, for producing dough in dough products. Despite the high vegetable content, a relatively low-carb dough product can be provided at the same time since a substantial depletion of carbohydrates in the dry matter takes place in the pomace. This makes it also possible in particular for vegetables which would be far too sweet for being used in largely neutral dough products, such as tortillas, pizza bases, toast, rolls, pasta, etc., in their pure form to be used as an essential component and in particular as a substantial flour substitute in dough products.

Thus, the invention provides an improved dough product as a preferably ready-to-eat and industrially produced food which is characterized by a relatively high vegetable content while having a very low carbohydrate content. Additionally, a dough product which is improved in particular compared to the use of known dried vegetable fibers and which has optimized organoleptic properties is provided. In particular, a food which is appealing in terms of color and taste and suitable for a health-conscious diet is provided.

Within the scope of the invention, the expression "based on one or more pomaces" means that the most essential component of the vegetable content in the dry matter is/are one or more vegetable pomaces. In a preferred embodiment, the pomace content in the dry matter of the vegetable content is 50% or higher, more preferably more than 70%, further preferably more than 80%, and even more preferably more than 95%. In a particularly preferred embodiment, the pomace content in the dry matter of the vegetable content is more than 97%.

In this context, a "pomace" is a product which remains after the squeezing of vegetables for producing juice, extracts and/or concentrate.

The term "dough" refers to a moldable intermediate product. The term "dough product" refers to a molded and baked or otherwise thermally treated dough. The expression "dried dough product" refers to a dough product which has been dried or dried further.

A "vegetable" in this context is a vegetable according to the food definition which, contrary to fruit (fruits of perennial plants), usually originates from annual plants or plants bearing fruit only once. Thus, the term "vegetable" as used herein can also comprise products which are not considered a vegetable in the botanical sense, such as eggplant, pumpkin, olive, bell pepper, tomato, zucchini, and cucumbers. In particular, the term refers to the fruits of annual or biannual plants, such as zucchini, bell pepper, pumpkins, cucumbers, and legumes. Eatable plant parts of annual, biannual or perennial plants, such as roots (parsnip, beet, carrot, onion), stems (red cabbage, white cabbage, kohlrabi, broccoli, cauliflower), leaves (red cabbage, white cabbage, kale, spinach), shoots (asparagus), and flowers (broccoli, artichoke) are to be included as well.

For clarification, the term vegetable as used herein is not supposed to comprise grains and seeds (e.g., flax seeds, sunflower seeds). Moreover, it is not supposed to include nuts (e.g., hazelnut) and seeds (e.g., almond) unless they are commonly consumed together with a vegetable they are part of. Also, the term "vegetable" is not supposed to comprise fruit according to the food definition, i.e., fruit which, contrary to vegetables, refers to the fruits of perennial plants and which typically has a sweetish or sourly taste in the raw state.

Within the scope of the present invention, the mentioned "vegetable content in the dry matter" relates to the dough product. Within the scope of the present invention, the term "carbohydrate content (absolute)" relates to the dough product. Within the scope of the present invention, the term "carbohydrate content in the dry matter" relates to the raw vegetable goods. The percentages relate to the mass percent or the weight percent in the dough product unless indicated otherwise.

Within the scope of the present invention, carbohydrates are always digestible carbohydrates as opposed to dietary fiber, the non-digestible carbohydrates.

The carbohydrate content (absolute) can be determined enzymatically using known methods. In particular, the different sugar contents of the dough product can be determined enzymatically in a known manner, preferably by means of suitable ASU (German: Amtliche Sammlung von Untersuchungsverfahren; official collection of analysis methods) measuring methods, and combined to calculate a carbohydrate value or a carbohydrate content. For example, total glucose is preferably determined by ASU L 07.00-33: 1987-05, glucose is determined by ASU L 07.00-22:1983-05, sucrose is determined by ASU L 07.00-24:1983-05, and fructose is determined by ASU L 26.11.03-8:1983-05. Other sugar contents can be determined using corresponding ASU methods known to the person skilled in the art. A suitable enzymatic analysis method is offered by Labor Kneißler GmbH & Co. KG, Burglengenfeld, for example.

The pomace or pomaces based on which the vegetable content in the dry matter of the dough product is provided preferably originate(s) from raw vegetable goods which have a carbohydrate content of more than 40% in the dry matter in the fresh state. Due to the depletion of carbohydrates taking place during the production of the pomace the carbohydrate content in the dry matter of the raw vegetable goods used can be lowered from a value of more than 40% to preferably less than 40%, more preferably less than 35%, further preferably less than 30%, even further preferably to less than 25%.

The present invention enables in particular the use of vegetables having a carbohydrate content of more than 40% in the dry matter in a substantial proportion in dough production, in particular as a substantial flour substitute in dough production. For instance, in the preferably industrial pomace production the carbohydrate content in the dry matter of the raw vegetable goods can be lowered from circa 44% to less than 30% in the case of carrots and from circa 61% to less than 30% in the case of beets.

In a preferred embodiment, the vegetable used for the pomace has a (fresh) dry matter of 4 to 25%, more preferably 4 to 20%, further preferably 4 to 16%.

In a preferred embodiment, the vegetable used for the pomace is selected from: carrot, parsnip, beet, red cabbage, white cabbage, cucumbers, tomato, pumpkin, zucchini, bell pepper, chicory, in particular Belgian endive, sugar beet, common bean, pea, kohlrabi and/or onions.

In the following Table 1 (source: Souci, Fachmann, Kraut 2004), the respective values for the dry matter and the carbohydrates in the dry matter are indicated for some of the particularly preferred vegetables mentioned above as examples. They are calculated based on the components. Fresh raw goods can exhibit higher carbohydrate contents.

TABLE 1

DM and CH in DM of example vegetables

|  | Dry matter (DM) | Carbohydrates in DM |
|---|---|---|
| Carrot | 10.8% | 44.4% |
| Parsnip | 17.6% | 68.8% |
| Beet | 13.7% | 61.3% |
| Red cabbage | 8.4% | 41.7% |
| White cabbage | 9.7% | 43.3% |
| Cucumber | 4.0% | 45.0% |
| Pumpkin | 9.0% | 51.1% |
| Tomato | 5.8% | 44.8% |
| Belgian endive | 6.0% | 40.0% |
| Common bean | 10.5% | 48.6% |
| Pumpkin | 9.0% | 51.1% |
| Kohlrabi | 8.4% | 44.0% |

The pomace-based vegetable content in the dough product preferably has a resulting carbohydrate content of less than 50%, more preferably less than 40%, further preferably less than 30% or 25%, and even further preferably less than 20% in the dry matter. Despite the relatively high vegetable content according to the invention, a dough product having a relatively low absolute target carbohydrate content can thus be provided.

The pomace used preferably has 10 to 30%, further preferably 15 to 30%, more preferably 20 to 30%, and even more preferably 22 to 30% dry matter. In a particularly preferred embodiment, the pomace has 22 to 25% dry matter. The pomace used is preferably an industrially produced or producible pomace. The dry matter of the pomace which is increased compared to the raw vegetable goods makes it possible for a relatively high vegetable content in the dough product to be provided.

The pomace used preferably has a mean particle size D(50,3) of at least 250 μm, further preferably at least 300 μm, and even further preferably at least 400 μm (measured using a laser light-scattering spectrometer Retsch Technology Horiba LA-960). In a particularly preferred embodiment example, the mean particle size D(50,3) is 250 μm to 1000 μm, more preferably 300 μm to 900 μm, and further preferably 400 μm to 700 μm.

In a preferred embodiment, the pomace used for each dough product is a fresh pomace. Alternatively, the pomace used can be a dried pomace. Likewise, the pomace used can be a pomace which is frozen in particular for intermediate storage and/or transport.

The pomace used is preferably a soured pomace. The pH of the pomace is preferably 3 to 6, more preferably 3.5 to 5.2, and further preferably 4.2 to 4.8.

In a preferred embodiment, the vegetable content has less than 25%, more preferably less than 15%, even further preferably less than 5%, and most preferably no, in particular dried, vegetable fibers in relation to the dry matter of the vegetable content. This refers in particular to vegetable fibers which are present or available in the market in particular in dried form and independent of the provided pomace.

In a preferred embodiment, the vegetable content in the dry matter of the dough product constitutes the essential portion, i.e., the highest content in percent.

The vegetable content amounts to preferably at least 20 to 70%, more preferably at least 30 to 65%, further preferably 40 to 65%, and even more preferably 50 to 65% of the dry matter of the dough product.

Advantageously, the lower carbohydrate content (abs.) of the dough product of preferably less than 20%, preferably less than 10%, and more preferably less than 5% is provided or made possible precisely by the relatively high vegetable content based on one or more pomaces, in particular as a flour substitute, of at least 20%, preferably at least 30%, and more preferably at least 40% in the dry matter of the dough product. In other words, the dough product preferably has the mentioned high vegetable content in particular in such a manner that the resulting dough product has a carbohydrate content (abs.) of less than 20%, preferably less than 10%, further preferably less than 7%, and even more preferably less than 5%.

In relation to the dry matter, the dough product can have 1 to 80%, further preferably 15 to 70%, and even further preferably 20 to 60% other components from one or more of the following food groups: plant fibers, plant proteins, oil seeds, oil press cakes, nuts, seeds, plant oils, in particular olive oil, dairy products, and/or chicken egg. In a particularly preferred embodiment, the above content of these other components in the dry matter of the dough product is at least 20 to 40% and alternatively at least 40 to 55%.

In a preferred embodiment, the dough product has a plant oil content of 5 to 30%, further preferably 10 to 25%, even further preferably 12 to 22% in relation to the dry matter. Particularly preferably, the plant oil content comprises olive oil or consists thereof.

In a preferred embodiment, the dough product has a plant fiber content of 5 to 35%, further preferably 9 to 28%, even further preferably 12 to 22% in relation to the dry matter. Particularly preferably, the plant fiber content comprises oat fibers or consists thereof.

In a preferred embodiment, the dough product has 5 to 30%, further preferably 10 to 25%, even further preferably 12 to 20% binder in relation to the dry matter. Preferably, the binder comprises locust bean gum, xanthan, *psyllium* husks, carrageen, guar gum, alginate, agar-agar, pectin, tragacanth, gum karaya, tara gum, and/or gellan gum. Particularly preferably, the binder content comprises ground *psyllium* husks or consists thereof.

In a preferred embodiment, the dough product has 0.5 to 5%, further preferably 1.5 to 4.5%, even further preferably 2.5 to 4% other components in relation to the dry matter. The other components can in particular be salt and/or an acidifier, in particular lemon juice. The salt content in the dough product is preferably 0.5 to 4.5%, further preferably 1.5 to 4%, even further preferably 2.5 to 3.5%.

In a particularly preferred embodiment, the dough product has a pomace-based vegetable content of 20 to 70%, a plant oil content of 5 to 30%, a plant fiber content of 5 to 35%, 5 to 30% binder, and 0.5 to 5% other components in relation to the dry matter or consists of said contents. Regarding the further preferred ranges for each of the individual components, reference is made to the above description of the respective contents.

In a preferred embodiment, the dough product has more than 6%, preferably more than 15%, more preferably more than 20% dietary fiber. The dietary fiber contained makes it possible for fillers to be provided in the dough product according to the invention. They can in particular replace carbohydrates as fillers, which are not present in the product according to the invention at all or only in very low percentages.

The dietary fiber content in the pomace is preferably more than 7%, further preferably more than 10%, even further preferably more than 13%. The content of the dietary fiber in the dry matter of the provided pomace is preferably more than 50%, further preferably more than 55%, even further preferably more than 60%.

The dough product according to the invention preferably has a protein content of less than 15%, preferably less than 10%, further preferably less than 5%, further preferably less than 2%, and even further preferably less than 1%, aside from the vegetable content.

In a particularly preferred embodiment, the dough product or the composition of the dough product is purely plant-based. In another preferred embodiment, the dough product or the composition of the dough product is gluten-free. In particular, the gluten content in the composition of the dough product is less than 20 ppm (20 mg/kg).

In a preferred embodiment, the dough product according to the invention is free from artificial and/or natural, in particular additional or added, taste-producing or flavoring substances.

In a preferred embodiment, the dough product is molded from a dough having 15 to 50%, more preferably 20 to 35%, further preferably 20 to 30% and even further preferably 20 to 27% dry matter during its production.

In a preferred embodiment, the dough product is preferably obtained by thermally treating the dough in particular after a molding of the dough. The thermal treatment is preferably a baking step or comprises the latter. Accordingly, the dough product is preferably a baked dough product. The dough is preferably thermally treated at more than 70° C., more preferably at more than 121° C., and further preferably at more than 180° C. This can take place by means of a wire mesh belt oven or a gastronomy oven, for example. Additionally or alternatively, the thermal treatment can also comprise desiccating the dough or the dough product at preferably 30 to 40° C.

The dry matter in the dough product according to the invention or the target dry matter after the thermal treatment of the dough amounts to 30 to 65%, preferably 35 to 55%, further preferably 35 to 50%, even further preferably 35 to 45%.

The dough product according to the invention can be provided in various forms. In particular, the dough product can be present in the form of a tortilla, a pizza base, a wrap, a toast, a roll, pasta, etc.

The dough product according to the invention is preferably present as a dough product pasteurized in the final packaging. In particular, the thermal treatment of the preferably previously molded dough and a subsequent packaging step can be followed by a pasteurization of the product in the final packaging.

In another aspect, the invention relates to a method for producing a pomace-based dough product as a ready-to-eat food product, preferably in final packaging, the method comprising the following steps:
  providing a preferably industrially processed vegetable pomace, which preferably has 10 to 30%, further preferably 15 to 30%, more preferably 20 to 30%, even more preferably 22 to 30% dry matter;
  mixing the vegetable pomace with other ingredients to form a dough in such a manner that the dough has a pomace-based vegetable content of at least 20%, preferably at least 30%, further preferably at least 40%, and even more preferably at least 50% in the dry matter;
  molding the dough; and
  thermally treating the dough at a temperature of preferably at least 70° C. and for a duration of 1 to 10 minutes in a baking step,
wherein the resulting dough product has 30 to 65% dry matter and a carbohydrate content (abs.) of less than 20%, preferably less than 10%, and more preferably less than 5%.

Providing the pomace(s) made of raw vegetable goods preferably comprises the step of preferably industrially preparing or obtaining the pomace or a corresponding, preferably industrial preparation process. Said step or said process is based on a known preparation of a pomace but includes at least one additional control and/or monitoring step for further processing into food suitable for human consumption.

In a preferred embodiment, the preparation step or the preparation process comprises the following sub-steps:
  cleaning the raw vegetable goods;
  peeling, preferably steam peeling;
  visually controlling and/or selecting suitable vegetable pieces;
  mechanical breakup and subsequent heating;
  squeezing or extraction, thus forming a pomace.

Cleaning initially comprises washing the raw vegetable goods preferably using a drum (spray) washer. Cleaning preferably further comprises de-stoning and/or de-soiling. This can take place using a stone separator of the drum washer, for example. Alternatively or additionally, a flotation de-stoner can be employed in particular for removing sand and smaller stones. Alternatively or additionally, a worm-gear or cyclone de-stoner can be employed in particular for removing larger stones.

Peeling, preferably steam peeling, preferably takes place by means of a pressure tank in which the vegetable goods are exposed to a predefined pressure for a defined duration.

Visual controlling and/or selecting suitable vegetable pieces preferably comprises transporting the washed and peeled vegetable goods on a transport or inspection belt, preferably with an associated sorting mechanism. In this process, the vegetable goods are selected or sorted into suitable and unsuitable goods. In particular, cracked and/or rotten vegetable goods, for example, can be sorted out in the process. The visual control and/or selection can take place either manually or automatically based on suitable image recognition, for example. The image recognition can take place based on comparative information or data stored in a database and/or comprise the analysis by means of an artificial neural network.

The mechanical breakup preferably takes place using a hammer mill or an impact mill. Souring agent, such as citric acid, can be added during, prior to, or after the mechanical breakup.

The mash obtained by the breakup is preferably pasteurized afterward.

Subsequently, squeezing or an extraction takes place, thereby forming a pomace and obtaining juice, extracts, and/or concentrate. This can take place by means of a known decanter, for example. The latter allows relatively high dry matters of the pomace to be obtained, in particular dry matters of at least 15%, more preferably at least 20%. Likewise, the use of a known belt press is possible, in which the mash is transported through press rolls of increasingly smaller diameter by means of a press belt and squeezed.

The obtained or provided pomace can be at least randomly subjected to laboratory control to examine the suitability for the use in food for human consumption.

The obtained pomace of the raw vegetables goods can be processed fresh or be frozen for storage and/or transport. The pomace according to the invention is preferably provided without further refining, i.e., in particular without further cleaning, refinement, separation, or concentration after the method steps described above.

During the pomace production or preparation, the dry matter is enriched while carbohydrates in the dry matter are depleted, as described above. This enables the realization of a substantial vegetable content in the dough product according to the invention by means of one or more pomaces while keeping the absolute carbohydrate content relatively low.

The method according to the invention can additionally comprise the further steps:
  pre-breakup of an in particular frozen pomace; and
  comminution of the pomace.

The vegetable pomace is mixed and processed into a dough by means of known devices. Subsequently, the dough rests for a suitable duration.

During the preferably subsequent molding, the dough is brought into the intended product shape, such as strips, cubes, or round slices. This preferably involves extruding a dough sheet of predefined thickness onto a transport belt by means of a slot nozzle.

Molding can comprise the step of manually or automatically cutting the dough into an intended product shape. This can take place on a transport belt disposed downstream of the slot nozzle, for example. For example, a round slice-shaped piece of dough having a predefined diameter, such as 200 to 280 mm, can be cut out for a dough product in the shape of a wrap, a tortilla, or a pizza base.

The thermal treatment of the dough preferably takes place in an oven, such as a wire mesh belt oven or a gastronomy oven, at a temperature of preferably 70° C. to 250° C., more preferably 121° C. to 230° C., and further preferably 180° C. to 230° C. The thermal treatment is carried out for a duration of 1 to 10 min, more preferably 1.5 to 3.5 min.

With the method according to the invention, a dough product as described above can be provided. The dough product can in particular be a tortilla, a wrap, a pizza base, a roll, and/or pasta.

In order to avoid redundancies, the features disclosed above in connection with the product according to the invention shall also be deemed to be disclosed for the method according to the invention. Likewise, the features disclosed in connection with the method according to the invention shall be deemed to also be disclosed and claimable for the product according to the invention.

EXAMPLES

Hereinafter, multiple examples will be described in more detail as preferable embodiments for the dough product according to the invention.

Example 1—Tortilla Based on a Carrot Pomace

For the following dough composition, a fresh carrot pomace is provided as a vegetable component of the dough and the later dough product. It has 15% dry matter (DM) and a carbohydrate content (CH) absolute (abs.) of 3%. The other ingredients are olive oil (DM 100%, CH 0%), oat fiber (DM 95%, CH 10%), *psyllium* husk flour (DM 95%, CH 0%), concentrated lemon juice (DM 25%, CH 21.40%), water (DM 0%, CH 0%), and salt (DM 100%, CH 0%). The composition of the dough is calculated for 1000 g.

TABLE 2

Recipe Example 1

| Ingredient | Amount [g] | [%] | DM [g] | DM vegetable [g] | CH [g] |
|---|---|---|---|---|---|
| Carrot pomace | 685.6 | 68.56 | 102.84 | 102.84 | 20.57 |
| Olive oil | 43.4 | 4.43 | 43.4 | 0 | 0 |
| Oat fiber | 41.3 | 4.13 | 39.23 | 0 | 4.13 |
| Psyllium husk flour | 39.4 | 3.94 | 37.43 | 0 | 0 |
| Concentrated lemon juice | 2 | 0.2 | 0.5 | 0 | 0.43 |
| Water | 181.6 | 18.16 | 0 | 0 | 0 |
| Salt | 6.6 | 0.66 | 6.6 | 0 | 0 |
| | | | 230 | 102.84 | 25.13 |
| | | | 23% | 45% | 2.5% |
| | | | DM dough | Veg/DM | CH (abs.) |

The fresh pomace is mixed with the other ingredients and processed into a dough. The latter has 23% dry matter, a vegetable content of 45% in the dry matter, and an absolute carbohydrate content of 2.5%.

The dough is extruded onto a transport belt in a thickness of 2 mm by means of a suitably shaped slot nozzle. Subsequently, the dough is cut in a round slice shape having a diameter of 260 mm. Then, the dough is baked in an oven (gastronomy oven Rational) for 7 min at 220° C. The resulting dough product has 40 to 45% dry matter and a carbohydrate content of 5%. In particular, a reduction in weight by the factor 1.9 takes place during the thermal treatment because of the dehydration. The vegetable content of 45% in the dry matter remains unchanged. The dietary fiber content in the dough product amounts to 21.9%

The resulting dough product in the form of a tortilla is purely plant-based.

Example 2—Pizza Base Based on a Beet Pomace

For the following dough composition, a beet pomace is provided as a vegetable component of the dough and the later dough product. It has 23% dry matter and a carbohydrate content (CH) (absolute) of 5%. The other ingredients are olive oil (DM 100%, CH 0%), oat fiber (DM 95%, CH 10%), *psyllium* husk flour (DM 95%, CH 0%), concentrated lemon juice (DM 25%, CH 21.40%), water (DM 0%, CH 0%), and salt (DM 100%, CH 0%). The composition of the dough is calculated for 1000 g.

TABLE 3

Recipe Example 2

| Ingredient | Amount [g] | [%] | DM [g] | DM vegetable [g] | CH [g] |
|---|---|---|---|---|---|
| Beet pomace | 499 | 49.9 | 112.28 | 112.28 | 24.95 |
| Olive oil | 31.6 | 3.16 | 31.6 | 0 | 0 |
| Oat fiber | 30.1 | 3.01 | 28.6 | 0 | 3.01 |
| Psyllium husk flour | 28.7 | 2.87 | 27.27 | 0 | 0 |
| Concentrated lemon juice | 2 | 0.2 | 0.5 | 0 | 0.43 |
| Water | 398.6 | 39.86 | 0 | 0 | 0 |
| Salt | 8 | 0.8 | 8 | 0 | 0 |
| | | | 208.25 | 112.28 | 28.39 |
| | | | 21% | 54% | 2.8% |
| | | | DM dough | Veg/DM | CH (abs.) |

The pomace is delivered frozen, pre-broken up first and subsequently comminuted. Then, the pomace is mixed with the other ingredients and processed into a dough. The latter has 21% dry matter, a vegetable content of 54% in the dry matter, and an absolute carbohydrate content of 2.8%.

The dough is extruded onto a transport belt in a thickness of 4.5 mm by means of a suitably shaped slot nozzle. Subsequently, the dough is cut out in a rectangular shape with the dimensions 200 mm×300 mm. Then, the dough is baked in an oven (wire mesh belt oven Zanolli) for 3.5 min at 220° C. The resulting dough product has 35 to 45% dry matter and a carbohydrate content of less than 6%. In particular, a reduction in weight by the factor 1.9 takes place during the thermal treatment because of the dehydration. The vegetable content of 54% in the dry matter remains unchanged.

The resulting dough product in the form of a pizza base is purely plant-based.

Example 3—Pizza Base Based on a Carrot Pomace with Flax Seeds

For the following dough composition, a carrot pomace is provided as a vegetable component of the dough and the later dough product. It has 15% dry matter and a carbohydrate content (CH) (absolute) of 3%. The other ingredients are olive oil (DM 100%, CH 0%), oat fiber (DM 95%, CH 10%), *psyllium* husk flour (DM 95%, CH 0%), concentrated lemon juice (DM 25%, CH 21.40%), water (DM 0%, CH 0%), salt (DM 100%, CH 0%), golden flax seed flour (DM 95%, CH 0%), coconut flour (DM 95%, CH 5%), and chia seeds (DM 94%, CH 5.30%). The composition of the dough is calculated for 1000 g.

TABLE 4

Recipe Example 3

| Ingredient | Amount [g] | [%] | DM [g] | DM vegetable [g] | CH [g] |
|---|---|---|---|---|---|
| Carrot pomace | 535 | 53.5 | 80.25 | 80.25 | 16.05 |
| Olive oil | 34 | 3.4 | 34 | 0 | 0 |
| Oat fiber | 32 | 3.2 | 30.4 | 0 | 3.2 |
| Psyllium husk flour | 31 | 3.1 | 29.45 | 0 | 0 |
| Concentrated lemon juice | 2 | 0.2 | 0.5 | 0 | 0.43 |
| Water | 272 | 27.2 | 0 | 0 | 0 |
| Salt | 7 | 0.7 | 7 | 0 | 0 |
| Golden flax seeds | 52 | 5.2 | 49.4 | 0 | 0 |
| Coconut flour | 26 | 2.6 | 24.7 | 0 | 1.3 |
| Chia seeds | 9 | 0.9 | 8.46 | 0 | 0.48 |
| | | | 264.16 | 80.25 | 21.46 |
| | | | 26.4% DM dough | 30.4% Veg/DM | 2.1% CH (abs.) |

The pomace is delivered frozen, pre-broken up first and subsequently comminuted. Then, the pomace is mixed with the other ingredients and processed into a dough. The latter has 26.4% dry matter, a vegetable content of 30.4% in the dry matter and an absolute carbohydrate content of 2.1%.

The dough is extruded onto a transport belt in a thickness of 6 mm by means of a suitably shaped slot nozzle. Subsequently, the dough is cut out in a rectangular shape with the dimensions 200 mm×300 mm. Then, the dough is baked in an oven (wire mesh belt oven Zanolli) at 220° C. until 40 to 50% dry matter is reached. The product has a carbohydrate content of less than 5%. In particular, a reduction in weight takes place during the thermal treatment because of the dehydration. The vegetable content of 30.4% in the dry matter remains unchanged.

The resulting dough product in the form of a pizza base is purely plant-based.

Example 4—Pizza Base Based on a Carrot Pomace with Cauliflower, Cheese, Egg

For the following dough composition, a carrot pomace is provided as a vegetable component of the dough and the later dough product. It has 15% dry matter and a carbohydrate content (CH) (absolute) of 3%. The other ingredients are olive oil (DM 100%, CH 0%), oat fiber (DM 95%, CH 10%), *psyllium* husk flour (DM 95%, CH 0%), concentrated lemon juice (DM 25%, CH 21.40%), water (DM 0%, CH 0%), salt (DM 100%, CH 0%), cauliflower (DM 7%, CH 2%), cheese (mozzarella) (DM 50%, CH 0%), and egg (DM 25.60%, CH 0%). The composition of the dough is calculated for 1000 g.

TABLE 5

Recipe Example 4

| Ingredient | Amount [g] | [%] | DM [g] | DM vegetable [g] | CH [g] |
|---|---|---|---|---|---|
| Carrot pomace | 494 | 49.4 | 74.1 | 74.1 | 14.82 |
| Olive oil | 31 | 3.1 | 31 | 0 | 0 |
| Oat fiber | 30 | 3.0 | 28.5 | 0 | 3.0 |

TABLE 5-continued

Recipe Example 4

| Ingredient | Amount [g] | [%] | DM [g] | DM vegetable [g] | CH [g] |
|---|---|---|---|---|---|
| Psyllium husk flour | 28 | 2.8 | 26.6 | 0 | 0 |
| Concentrated lemon juice | 1 | 0.1 | 0.25 | 0 | 0.21 |
| Water | 131 | 13.1 | 0 | 0 | 0 |
| Salt | 6 | 0.6 | 6 | 0 | 0 |
| Cauliflower | 137 | 13.7 | 9.59 | 9.59 | 2.74 |
| Cheese (mozzarella) | 110 | 11.0 | 55 | 0 | 0 |
| Egg | 32 | 3.2 | 8.2 | 0 | 0 |
| | | | 239.24 | 83.69 | 20.77 |
| | | | 23.9% DM dough | 35% Veg/DM | 2.1% CH (abs.) |

The pomace is delivered frozen, pre-broken up and subsequently comminuted. Then, the pomace is mixed with the other ingredients and processed into a dough. The latter has 23.9% dry matter, a vegetable content of 35% in the dry matter and an absolute carbohydrate content of 2.1%.

The dough is extruded onto a transport belt in a thickness of 6 mm by means of a suitably shaped slot nozzle. Subsequently, the dough is cut out in a rectangular shape with the dimensions 200 mm×300 mm. Then, the dough is baked in an oven (wire mesh belt oven Zanolli) at 220° C. until 40 to 50% dry matter is reached. The resulting dough product has a carbohydrate content of less than 5%. In particular, a reduction in weight takes place during the thermal treatment because of the dehydration. The vegetable content of 35% in the dry matter remains unchanged.

Example 5—Pizza Base Based on a Carrot Pomace with Almond Flour, Cheese, Egg

For the following dough composition, a carrot pomace is provided as a vegetable component of the dough and the later dough product. It has 15% dry matter and a carbohydrate content (CH) (absolute) of 3%. The other ingredients are olive oil (DM 100%, CH 0%), oat fiber (DM 95%, CH 10%), *psyllium* husk flour (DM 95%, CH 0%), concentrated lemon juice (DM 25%, CH 21.40%), water (DM 0%, CH 0%), salt (DM 100%, CH 0%), cheese (mozzarella) (DM 50%, CH 0%), egg (DM 25.60%, CH 0%), almond flour (DM 95%, CH 3.7%), and cream cheese (DM 35%, CH 3%). The composition of the dough is calculated for 1000 g.

TABLE 6

Recipe Example 5

| Ingredient | Amount [g] | [%] | DM [g] | DM vegetable [g] | CH [g] |
|---|---|---|---|---|---|
| Carrot pomace | 446 | 44.6 | 66.9 | 66.9 | 13.38 |
| Olive oil | 44 | 4.4 | 44 | 0 | 0 |
| Oat fiber | 27 | 2.7 | 25.65 | 0 | 2.7 |
| Psyllium husk flour | 26 | 2.6 | 24.7 | 0 | 0 |
| Concentrated lemon juice | 1 | 0.1 | 0.25 | 0 | 0.21 |
| Water | 118 | 11.8 | 0 | 0 | 0 |
| Salt | 4 | 0.4 | 4 | 0 | 0 |

TABLE 6-continued

Recipe Example 5

| Ingredient | Amount [g] | [%] | DM [g] | DM vegetable [g] | CH [g] |
|---|---|---|---|---|---|
| Cheese (mozzarella) | 120 | 12 | 60 | 0 | 0 |
| Egg | 93 | 9.3 | 23.8 | 0 | 0 |
| Almond flour | 64 | 6.4 | 60.8 | 0 | 2.37 |
| Cream cheese | 56 | 5.6 | 19.6 | 0 | 1.68 |
| | | | 329.7 | 66.9 | 20.34 |
| | | | 33% DM dough | 20.3% Veg/DM | 2% CH (abs.) |

The pomace is delivered frozen, pre-broken up first and subsequently comminuted. The pomace is then mixed with the other ingredients and processed into a dough. The latter has 33% dry matter, a vegetable content of 20.3% in the dry matter, and an absolute carbohydrate content of 2%.

The dough is extruded onto a transport belt in a thickness of 4 mm by means of a suitably shaped slot nozzle. Subsequently, the dough is cut out in a rectangular shape with the dimensions 200 mm×300 mm. Then, the dough is baked in an oven (wire mesh belt oven Zanolli) at 220° C. until 45 to 55% dry matter is reached. The resulting dough product has a carbohydrate content of less than 4%. In particular, a reduction in weight takes place during the thermal treatment because of the dehydration. The vegetable content of 20.3% in the dry matter remains unchanged.

Example 6—English Muffin Based on a Carrot Pomace with Almond Flour, Coconut Flour, and Soy Flour For the following dough composition, a carrot pomace is provided as a vegetable component of the dough and the later dough product. It has 15% dry matter and a carbohydrate content (CH) (absolute) of 3%. The other ingredients are olive oil (DM 100%, CH 0%), oat fiber (DM 95%, CH 10%), *psyllium* husk flour (DM 95%, CH 0%), concentrated lemon juice (DM 25%, CH 21.40%), water (DM 0%, CH 0%), salt (DM 100%, CH 0%), coconut flour (DM 95%, CH 5%), almond flour (DM 95%, CH 3.7%), soy flour (DM 90.90%, CH 3.10%), locust bean gum (DM 11.45%, CH 7.30%), and leavening agent (sodium bicarbonate, pure cream of tartar, DM 95%, CH 0%). The composition of the dough is calculated for 1000 g.

TABLE 7

Recipe Example 6

| Ingredient | Amount [g] | [%] | DM [g] | DM vegetable [g] | CH [g] |
|---|---|---|---|---|---|
| Carrot pomace | 480 | 48 | 72 | 72 | 14.4 |
| Olive oil | 38 | 3.8 | 38 | 0 | 0 |
| Oat fiber | 29 | 2.9 | 27.55 | 0 | 2.9 |
| Psyllium husk flour | 28 | 2.8 | 26.6 | 0 | 0 |
| Concentrated lemon juice | 1 | 0.1 | 0.25 | 0 | 0.21 |
| Water | 241 | 24.1 | 0 | 0 | 0 |
| Salt | 9 | 0.9 | 9 | 0 | 0 |
| Coconut flour | 40 | 4.0 | 38 | 0 | 2 |
| Almond flour | 82 | 8.2 | 77.9 | 0 | 3 |
| Soy flour | 32 | 3.2 | 29.09 | 29.09 | 0.99 |

TABLE 7-continued

Recipe Example 6

| Ingredient | Amount [g] | [%] | DM [g] | DM vegetable [g] | CH [g] |
|---|---|---|---|---|---|
| Locust bean gum | 5 | 0.5 | 0.57 | 0 | 0.36 |
| Leavening agent | 15 | 1.5 | 14.25 | 0 | 0 |
| | | | 333.21 | 101.09 | 23.9 |
| | | | 33.3% DM dough | 30.3% Veg/DM | 2.4% CH (abs.) |

The pomace is delivered frozen, pre-broken up first and subsequently comminuted. Then, the pomace is mixed with the other ingredients and processed into a dough. The latter has 33.3% dry matter, a vegetable content of 30.3% in the dry matter and an absolute carbohydrate content of 2.4%.

The dough is extruded onto a transport belt in a thickness of 6 mm by means of a suitably shaped slot nozzle. Subsequently, the dough is cut out in a rectangular shape with the dimensions 100 mm×100 mm. Then, the dough is baked in an oven (wire mesh belt oven Zanolli) at 220° C. until 45 to 55% dry matter is reached. The resulting dough product has a carbohydrate content of about 4%. In particular, a reduction in weight takes place during the thermal treatment because of the dehydration. The vegetable content of 30.3% in the dry matter remains unchanged.

The resulting dough product in the form of an English muffin is purely plant-based.

Example 7—Wrap Based on a Carrot Pomace with Almond Flour, Coconut Flour, and Soy Flour For the following dough composition, a carrot pomace is provided as a vegetable component of the dough and the later dough product. It has 15% dry matter and a carbohydrate content (CH) (absolute) of 3%. The other ingredients are olive oil (DM 100%, CH 0%), oat fiber (DM 95%, CH 10%), *psyllium* husk flour (DM 95%, CH 0%), concentrated lemon juice (DM 25%, CH 21.40%), water (DM 0%, CH 0%), salt (DM 100%, CH 0%), coconut flour (DM 95%, CH 5%), almond flour (DM 95%, CH 3.7%), soy flour (DM 90.90%, CH 3.10%), and locust bean gum (DM 11.45%, CH 7.30%). The composition of the dough is calculated for 1000 g.

TABLE 8

Recipe Example 7

| Ingredient | Amount [g] | [%] | DM [g] | DM vegetable [g] | CH [g] |
|---|---|---|---|---|---|
| Carrot pomace | 343 | 34.3 | 51.4 | 51.4 | 10.3 |
| Olive oil | 34 | 3.4 | 33.9 | 0 | 0 |
| Oat fiber | 21 | 2.1 | 19.6 | 0 | 2.1 |
| Psyllium husk flour | 20 | 2.0 | 18.7 | 0 | 0 |
| Concentrated lemon juice | 1 | 0.1 | 0.25 | 0 | 0.21 |
| Water | 281 | 28.1 | 0 | 0 | 0 |
| Salt | 11 | 1.1 | 11 | 0 | 0 |
| Coconut flour | 76 | 7.6 | 72.2 | 0 | 3.8 |
| Almond flour | 152 | 15.2 | 144.4 | 0 | 5.6 |
| Soy flour | 53 | 5.3 | 48.4 | 48.4 | 1.6 |
| Locust bean gum | 9 | 0.9 | 1.0 | 0 | 0.7 |
| | | | 400.85 | 99.8 | 24.3 |
| | | | 40.1% DM dough | 24.9% Veg/DM | 2.4% CH (abs.) |

The fresh pomace is mixed with the other ingredients and processed into a dough. The latter has 40.1% dry matter, a vegetable content of 24.9% in the dry matter, and an absolute carbohydrate content of 2.4%.

The dough is extruded onto a transport belt in a thickness of 3 mm by means of a suitably shaped slot nozzle. Subsequently, the dough is cut out in a round slice shape having a diameter of 180 mm. Then, the dough is baked in an oven (gastronomy oven Rational) at 220° C. until 55 to 65% dry matter is reached. The resulting dough product has a carbohydrate content of less than 5%. In particular, a reduction in weight by the factor 1.3 takes place during the thermal treatment because of the dehydration. The vegetable content of 24.9% in the dry matter remains unchanged.

The resulting dough product in the form of a wrap is purely plant-based.

The invention claimed is:

1. A pomace-based dough product as a ready-to-eat food product, the dough product comprising a vegetable content based on one or more pomaces and of at least 20% by weight in dry matter of the dough product, wherein the dough product is a baked dough product, wherein the dough product has 30 to 65% by weight as the dry matter, and wherein the dough product has a carbohydrate content (abs.) of less than 20% by weight, wherein the dough product has more than 6% by weight dietary fiber, and wherein the dough product is a tortilla, a wrap, a pizza base, or a roll.

2. The dough product according to claim 1, wherein the one or more pomaces originate from raw vegetable goods which have a carbohydrate content of more than 40% by weight in the dry matter in a fresh state, and/or wherein the pomace has a carbohydrate content of less than 40% by weight.

3. The dough product according to claim 1, wherein the vegetable content has a carbohydrate content of less than 50% by weight.

4. The dough product according to claim 1, wherein the one or more pomaces comprises a fresh pomace having 10 to 30% by weight dry matter.

5. The dough product according to claim 1, wherein the one or more pomaces comprises a soured pomace having a pH of 3 to 6.

6. The dough product according to claim 1, wherein the one or more pomaces comprises a dried pomace.

7. The dough product according to claim 1, wherein vegetable used for the one or more pomaces is selected from: carrot, parsnip, beet, red cabbage, white cabbage, cucumbers, tomato, pumpkin, zucchini, bell pepper, chicory, Belgian endive, sugar beet, common bean, pea, kohlrabi, and/or onions.

8. The dough product according to claim 1, wherein the dough product contains 1 to 80% by weight other components from one or more of the following food groups in relation to the dry matter: plant fibers, plant proteins, oil seeds, oil press cakes, nuts, seeds, plant oils, dairy products, and/or chicken egg.

9. The dough product according to claim 1, wherein the dough product has a plant oil content of 5 to 30% by weight in relation to the dry matter.

10. The dough product according to claim 1, wherein the dough product has a plant fiber content, of 5 to 35% by weight in relation to the dry matter.

11. The dough product according to claim 1, wherein the dough product has a binder content of 5 to 30% by weight in relation to the dry matter.

12. The dough product according to claim 11, wherein the binder content is selected from: locust bean gum, xanthan, ground *psyllium* husks, carrageen, guar gum, alginate, agar-agar, pectin, tragacanth, gum karaya, tara gum, and/or gellan gum.

13. The dough product according to claim 1, wherein the dough product consists of 20 to 70% by weight pomace-based vegetable content, 5 to 30% by weight plant oil content, 5 to 35% by weight plant fiber content, 5 to 30% by weight binder content, and 0.5 to 5% by weight other components in relation to the dry matter.

14. The dough product according to claim 1, wherein the composition of the dough product is purely plant-based.

15. The dough product according to claim 1, wherein composition of the dough product is gluten-free.

16. The dough product according to claim 1, wherein the dough product has a protein content of less than 15% by weight aside from the vegetable content.

17. The dough product according to claim 1, wherein the dough product has 35 to 55% by weight dry matter.

18. The dough product according to claim 1, wherein the dough product is obtained by thermally treating a dough after molding at temperatures of more than 70° C. in a baking step.

19. The dough product according to claim 1, wherein the dough product is present as a dough product pasteurized in a final packaging.

20. A method for producing the pomace-based dough product as a ready-to-eat food product according to claim 1, in final packaging, the method comprising the following steps:
providing a industrially processed vegetable pomace, which has 10 to 30% by weight dry matter;
mixing the vegetable pomace with other ingredients to form a dough in such a manner that the dough has a pomace-based vegetable content of at least 20% by weight in the dry matter;
molding the dough; and
thermally treating the dough with a temperature of at least 70° C. and for a duration of 1 to 10 minutes in a baking step,
wherein the resulting dough product has 30 to 65% by weight dry matter and a carbohydrate content (abs.) of less than 20% by weight.

* * * * *